Nov. 23, 1948.                    D. M. LEITCH                    2,454,658
                              TAIL WHEEL MECHANISM
Filed Dec. 26, 1944                                              4 Sheets-Sheet 1
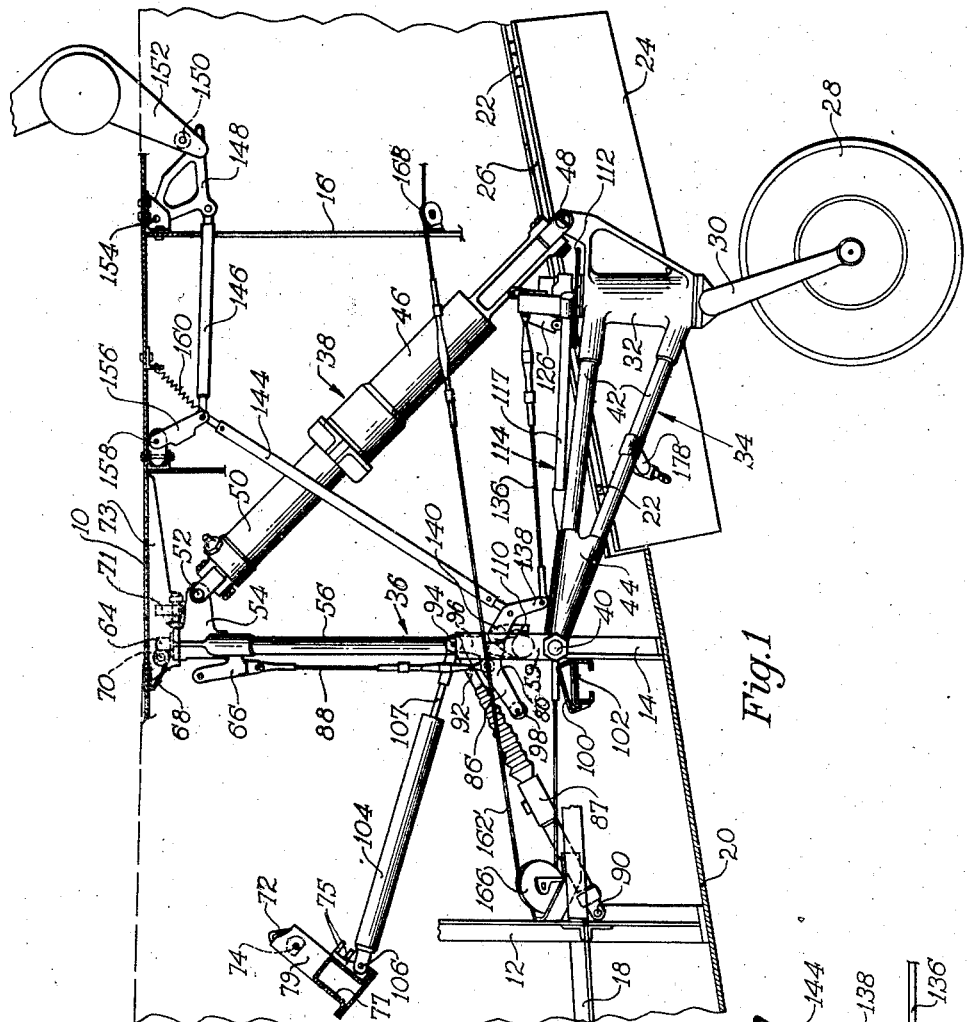
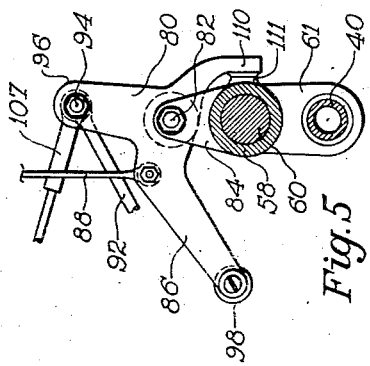
INVENTOR.
Donald M. Leitch
BY
*Lyon & Lyon*
Attorneys Nov. 23, 1948.  D. M. LEITCH  2,454,658
TAIL WHEEL MECHANISM
Filed Dec. 26, 1944  4 Sheets-Sheet 2
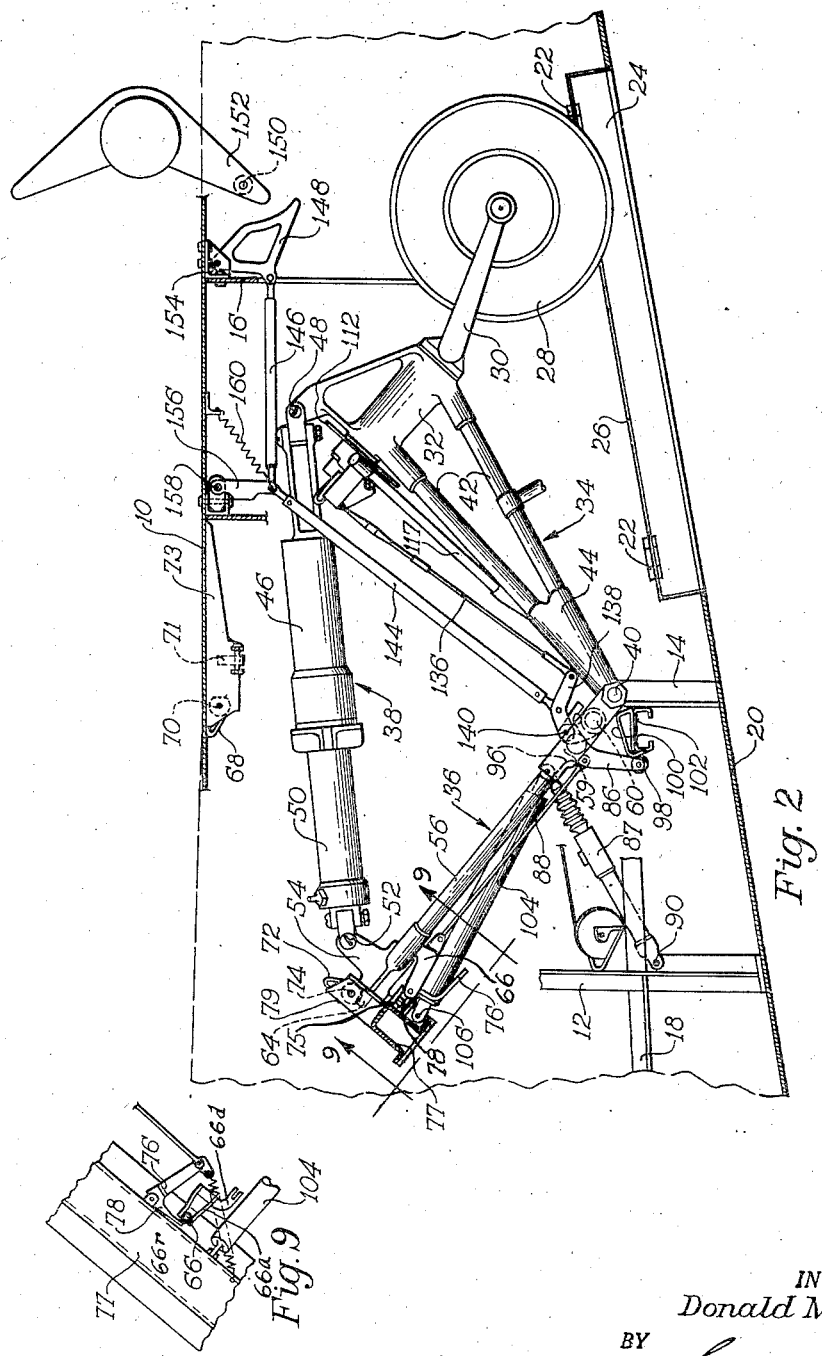
INVENTOR.
Donald M. Leitch
BY
Lyon & Lyon
Attorneys Nov. 23, 1948.　　　　D. M. LEITCH　　　　2,454,658
TAIL WHEEL MECHANISM Filed Dec. 26, 1944　　　　　　　　　　4 Sheets-Sheet 3

INVENTOR.
Donald M. Leitch
BY
Lyon & Lyon
Attorneys

Nov. 23, 1948.　　　　D. M. LEITCH　　　　2,454,658
TAIL WHEEL MECHANISM

Filed Dec. 26, 1944　　　　　　　　　　　　4 Sheets-Sheet 4

INVENTOR.
Donald M. Leitch
BY Lyon & Lyon
Attorneys

Patented Nov. 23, 1948

2,454,658

UNITED STATES PATENT OFFICE 2,454,658

TAIL WHEEL MECHANISM

Donald M. Leitch, Los Angeles, Calif., assignor to North American Aviation, Inc.

Application December 26, 1944, Serial No. 569,810

9 Claims. (Cl. 244—109)

This invention relates to tail wheel mechanism for aircraft, and has as its general object to provide an improved mechanism for mounting a tail wheel in an airplane so as to provide for cushioning of landing shocks, the retracting of a wheel into the fuselage, the steering of the tail wheel for ground maneuvering and, under certain conditions, the release of the tail wheel for free castoring.

Retractable tail wheel mechanisms incorporating shock struts have been previously devised. In some of these mechanisms, provision for breaking the strut in order to permit the folding of the tail wheel into a retracted position has been made; and in other mechanisms, provision has been made for sliding the upper end of the shock strut on a track to permit the tail wheel to swing upwardly into the fuselage. These arrangements have certain disadvantages. It is preferable, if possible, to employ a shock strut which does not break. A sliding track mechanism does not permit the desired freedom of operation and usually requires a positive means for lowering the landing gear. One of the principal objects of the present invention is therefore to provide a tail wheel mechanism which utilizes a conventional, non-folding shock strut and which provides for a maximum facility of raising and lowering the tail wheel. In this connection, it is a specific object of the invention to provide for free gravity lowering of the tail wheel.

A further object of the invention is to provide for latching the tail wheel in the lowered position in such a manner as to resist landing shocks applied thereto; latching the tail wheel in the retracted position in such a manner as to support the same against the pull of gravity and loads resulting from flight maneuvers; and automatically latching in both of these positions; to provide a single latching mechanism for latching in both of these positions; to provide for automatic unlatching (in response to retracting movement) in the lowered position while requiring positive operator controlled unlatching in the retracted position.

Another object of the invention is to correlate with a tail wheel arrangement, having the features above noted, a steering mechanism which may, if desired, be connected to the rudder for simultaneous operation therewith; which may, at the will of the operator, be disconnected from the tail wheel to permit the latter to freely castor; and which, while incorporating a conventional cable type of steering power transmission, will permit the tail wheel assembly to be raised and lowered without interfering with or changing the tension in the cables.

A further object of the invention is to correlate with a tail wheel assembly having the features described above, a mechanism adapted to automatically release the tail wheel for castoring when the elevators are depressed as in ground maneuvering, and, conversely, to automatically lock the tail wheel against uncontrolled movement when the assembly is in the retracted position.

Like reference characters designate similar parts in the several views of the drawings, in which:

Fig. 1 is a side elevation of a tail wheel mechanism embodying the invention;

Fig. 2 is a side elevation of the same mechanism shown in the retracted position;

Fig. 5 is a detail view of the latch release bellcrank, taken on the line 5—5 of Fig. 3;

Fig. 6 is a detail view of the forward steering lock release arm;

Fig. 9 is a detail of the up-latch releasing mechanism, taken on the line 9—9 of Fig. 2.

Figure 3:
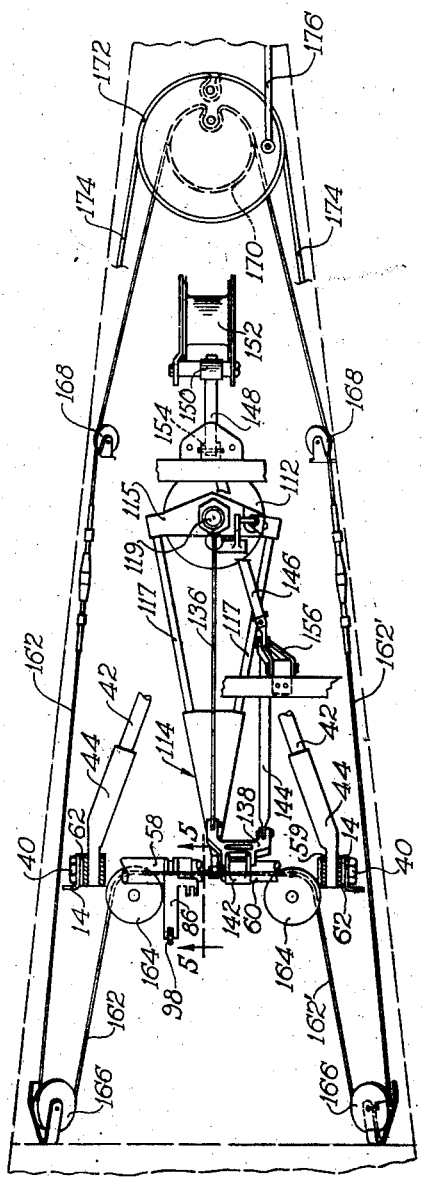
Fig. 3 is a plan view of the mechanism.

As an example of one form in which the invention may be embodied, I have shown in the drawings a portion of the tail wheel mechanism of a conventional fighter airplane having fuselage frame members including a deck member 10, vertical frame members 12, 14 and 16, a longeron 18, and a portion of the fuselage skin 20 to which are hinged at 22 fairing doors 24, which, when the landing gear mechanism is in the retracted position, close an opening 26 through which the landing gear is lowered to the position shown in Fig. 1.

The tail wheel assembly includes the tail wheel 28 pivoted in a fork 30 which is journaled in a fork housing 32 forming the rear portion of a chassis which is indicated generally at 34. The chassis in turn forms one leg of a triangular-shaped assembly including, as the other two legs thereof, a vertical truss 36 and the shock strut 38. This triangular-shaped assembly is adapted to swing as a unit around the horizontal transverse axis of a pair of trunnions 40 (by means of which the assembly is pivoted to the vertical frame member 14) from the lowered position shown in Fig. 1 to the retracted position shown in Fig. 2. At the same time, when the assembly is in the lowered position, the chassis 34 may pivot around the same axis to permit the shock strut 38 to yield under ground loads.

The chassis 34 comprises the fork housing 32, two pairs of arms 42, attached thereto, and a pair of trunnion spiders 44 to which the forward ends of each pair of arms 42 are secured. Viewed in plan, the pairs of arms 42 diverge forwardly from the housing 32 to the spiders 44, the latter being spaced apart sufficiently to provide adequate stability in the structure and to accommodate between them the steering and steering lock release mechanism which will hereinafter be described.

The shock strut 38 comprises a cylinder 46, the lower end of which is pivoted at 48 to the fork housing 32 and a piston 50, telescoped into cylinder 46 and having its upper end pivoted at 52 to a fitting 54 which forms the upper end of the vertical truss 36. The shock strut 38 may be of any conventional type utilizing hydraulic, pneumatic, combined hydraulic and pneumatic, spring or rubber cushion-type shock absorbing mechanism.

Figure 4:
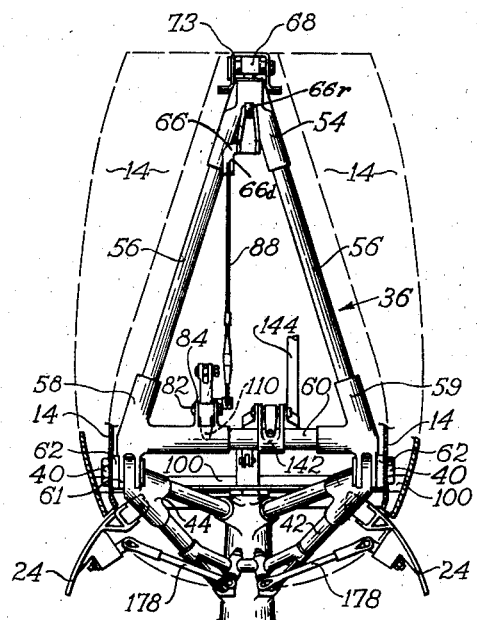
Fig. 4 is a front elevation of the same mechanism.

The vertical truss 36 is triangular in shape as shown in Fig. 4 and includes a pair of downwardly diverging arms 56 the upper ends of which are secured in the fitting 54 and the lower ends of which are secured in fittings 58 and 59 which are connected by a horizontal shaft 60. The fittings 58 and 59 have downwardly projecting ears 61 between which the spiders 44 are pivoted by the trunnions 40, the latter being extended through the ears 61 and into bearings 62 carried by the upright frame members 14.

The latching mechanism comprises a bolt 64 which is slidable in a bearing in the fitting 54 and has attached to its lower end a release trigger 66. The bolt 64 is yieldingly urged upwardly by conventional spring means (not shown) housed in the fitting 54 and is adapted, as the tail wheel assembly swings downwardly toward the lowered position, to ride against a latch arm cam 68 by means of which it is retracted until it snaps into locked position engaging a stop 70 so as to lock the truss 36 in the position shown in Fig. 1 in which it will carry the landing loads transmitted from the shock strut 38. Lowering movement of the tail wheel assembly beyond the latched position of Fig. 1 is prevented by a stop 71 against which the fitting 54 engages. The stop 71 forms a part of a fitting 73 secured to the deck member 10 and on which the cam 68 and stop 70 are mounted.

As the tail wheel assembly approaches the retracted position shown in Fig. 2, the bolt 64 will ride against a cam 72 by means of which it will be retracted until it snaps into the position shown in Fig. 2 engaging against a stop 74 by means of which the weight of the assembly is supported in the retracted position. The retracting movement of the tail wheel assembly is arrested at the latching position of Fig. 2 by the contact of the fitting 54 against a pad 75 carried by a transverse frame member 77. The cam 72 and stop 74 are mounted on a bracket 79 which is also carried by the frame 77.

From the retracted position the tail wheel assembly is released for gravity movement to the extended or lowered position by the pilot. The release is affected by the disengagement of the latch bolt 64 from the stop 74 by means of fitting 66. This fitting has a collar which encircles the lower portion of the port member and is provided with a pair of parallel upwardly extending arms 66a which carry between their upper tips a roller 66r. A depending arm 66d is also provided for attachment to cable 88. The release mechanism (shown in Figure 9) provides a release lever 76 pivoted on a small fitting attached to the transverse frame member 77. This fitting also forms a stop or pad 75 by means of which the gear is arrested from further upward movement. The member 76 is provided with a finger 78 which engages the roller 66r to affect the retraction of the bolt 64, pressure exerted on the roller 66r through lever 76 serving to overcome the spring load on the bolt. The release lever 76 is actuated by the cable X which runs to the pilot's control.

For retracting the bolt 64 preparatory to raising the tail wheel assembly, there is provided a bell crank lever 80 (Fig. 5) which is pivoted at 82 between a pair of ears 84 formed on the fitting 58, and which has a forwardly projected arm 86 to which the trigger 66 is linked by a pull cable 88, so that forward and downward swinging movement of the bell crank 86 will cause the bolt 64 to be drawn to the released position. This movement of the bell crank 80 is effected in conjunction with the beginning of power operated retraction of the tail wheel assembly, which is accomplished by a retracting strut 87 pivoted at 90 to the upright frame member 12 and having a piston rod 92 pivoted at 94 to an upwardly projected arm 96 of the bell crank 80. Retracting movement of the strut 87 first causes the bell crank 80 to pivot on its trunnion 82 (thus releasing the latch) until a roller 98 on the end of the arm 86 engages a cam plate 100 carried by a transverse frame member 102, and further retracting movement of the strut 87 will then result in bodily forward movement of the bell crank 80 with the roller 98 fulcruming and rolling forwardly against the cam 100 whereby the entire tail wheel assembly is swung upwardly and forwardly to the retracted position shown in Fig. 2, in which position the roller 98 has dropped over the forward side of the cam 100. In the engagement of the roller 98 with the cam 100, the bell crank 80 will be oscillated back (with relation to the truss 36) to the position in which the bolt 64 is permitted to return to its projected position.

The bell crank 80 is urged toward its latch-projecting position by means of a bungee 104 which is pivoted at 106 to the frame member 77 and which has a plunger 107 pivoted to the arm 96 at the pivot 94 and yieldingly urged outwardly by spring or pneumatic means therewithin.

The bungee 104 has the primary function of returning the bell crank 80 to the latch-projected position against the resistance of the retracting strut 87 during the downward movement of the tail wheel assembly, in order that the latch may be operative to automatically latch the assembly in the lowered position when that position is reached. Bell crank 80 has a downwardly projecting finger 110 which, when the bell crank has thus been returned to the latch-projecting position, engages against a pad 111 on the fitting 58 to limit such movement and permit the yielding pressure of the bungee henceforth to be transmitted to the truss 36 to assist in the lowering movement of the tail wheel assembly.

Figures 7, 8:
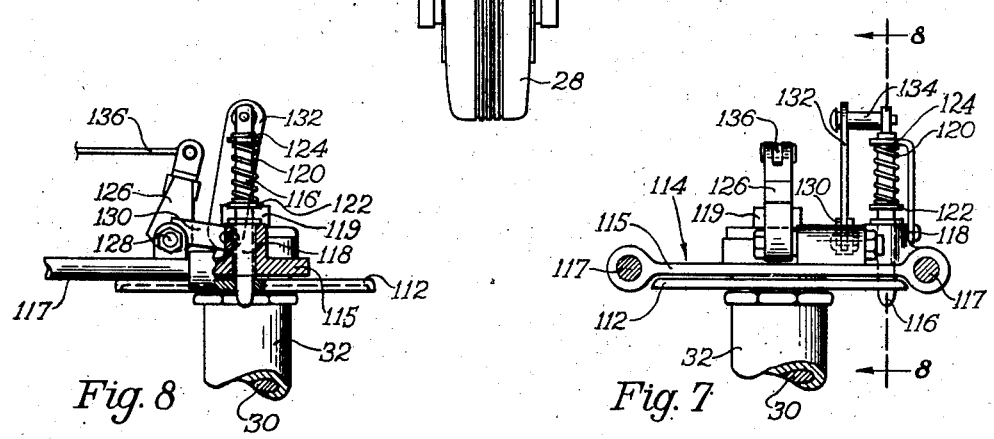
Fig. 7 is a front elevation of the steering lock mechanism.
Fig. 8 is a sectional view of the same taken on the line 8—8 of Fig. 7.

The steering mechanism comprises a locking plate 112 affixed to the upper end of the fork 30, and a tiller assembly 114 normally connected to the locking plate 112 by a locking pin 116 (see Figs. 7 and 8). The tiller 114 comprises a fitting 115 and a pair of arms 117 fixed therein. The fitting 115 is loosely mounted on the reduced upper end portion 119 of the fork 30. The pin 116 is mounted in a bearing 118 in the fitting 115 for vertical sliding movement into engagement with the plate 112, under the urge of a spring 120 which is compressed between a shoulder 122 on the pin 116 and a bracket 124 carried by the fitting 115. For releasing the wheel 28 for castoring, there is provided a bell crank lever 126 pivoted at 128 on the fitting 115 and having a horizontal arm 130 adapted to transmit upward movement to the pin 116 through a link 132 respective ends of which are pivoted to the arm 130 and to a laterally projecting stud 134 on the pin 116. To the upper end of the bell crank 126 is linked a pull cable 136, the forward end of which is linked to an arm 138 pivoted at 140 to a fitting 142 mounted on the transverse shaft 60 at the lower end of the truss 36. Release of the pin 116 is effected by downward and forward swinging movement of the arm 138 which swinging movement is transmitted to the arm 138 through push rods 144 and 146 and a cam 148 from a roller 150 carried by the elevator horn 152. When the elevators are depressed, the roller 150 will engage the cam 148 in such a manner as to move the latter downwardly and forwardly about its pivotal connection 154 with the deck 10, causing the push rod 146 to move forwardly, swinging an arm 156 (to which the rods 144 and 146 are pivoted) about its pivotal connection 158 with the deck 10, this swinging movement of the arm 156 being in turn transmitted to the push rod 144 to move the latter downwardly and forwardly so as to release the pin 116 from the plate 112 as previously described. When the elevators are returned to their normal position, the linkage just described will return to a position permitting the locking pin 116 to automatically re-engage in the plate 112 under the urge of the spring 120, the return movement of the linkage being effected by a spring 160 under tension between the arm 156 and the deck 10.

The pivotal connection between the cable 136 and the arm 138 is positioned as near as possible to the axis of the trunnions 40 so that the upward movement of the chassis 42, incidental to yielding of the strut 38 during taxiing, will not result in the pin 116 being disengaged from the plate 112. When the tail wheel mechanism is raised to the retracted position, the arm 138 will swing bodily forward through an arc about the main axis 40 and will draw the rods 144 and 146 forwardly so as to withdraw the cam 148 from operative association with the elevator horn, and thus permit normal operation of the elevator without releasing the lock pin 116. Thus, the tail wheel remains constantly locked to the tiller 114 when the assembly is in the retracted position and thereby restrained against uncontrolled movement while the plane is in flight.

Steering of the tail wheel is transmitted to the tiller by a pair of cables 162, 162' attached to the forward end of the tiller, as shown in Fig. 3, extending around a pair of pulleys 164, thence extending forwardly and around a pair of pulleys 166, thence extending rearwardly and past a pair of pulleys 168 and thence secured to a drum 170 which is attached to the drum 172 to which the steering control is transmitted by the conventional steering cables 174. The rudder (not shown) is operated by a link 176 connected to the drum 172 and extends rearwardly therefrom.

It may now be noted that when the tail wheel is retracted, it will have a certain limited amount of oscillating movement in response to rudder operation. Provision is made for sufficient room in the fuselage to accommodate this limited oscillated movement without interference. It also may be pointed out that the drum 170 is made considerably smaller than the drum 172 so as to provide a reduced ratio of transmission of steering movement to the tail wheel so that ground shocks and ground resistance to turning movement are reduced to the point where they do not unduly inconvenience the pilot.

The fairing doors 24 are tied to the tail wheel assembly by operating links 178 so as to be closed during the upper portion of the retracting movement. This is a conventional arrangement and does not form a part of the present invention.

The foregoing may be taken as illustrative of one form in which the invention may be embodied, it being our intention to cover in our claims the use of any equivalent arrangement or apparatus.

I claim as my invention:

1. Tail wheel mechanism for aircraft having a fuselage; comprising a chassis formed at one end with a fork housing, a tail wheel fork journaled in said housing, a truss pivoted to the other end of said chassis, a shock strut pivoted at one end to the other end of said truss and at the other end to the chassis near said housing, thereby to provide a triangular assembly which is pivoted, near the pivot between said chassis and truss, for bodily swinging movement from an extended position in which the chassis is substantially horizontal to a raised, retracted position, means for establishing a latching connection between said assembly and said fuselage in the extended position in such a manner as to take the loads of ground operation, and means for establishing a latching connection between said assembly and said fuselage in the retracted position including a latch bolt slidably mounted in the upper end of said truss, coacting latch devices secured to the fuselage at spaced points and including means for automatically depressing said bolt as said assembly approaches each of its latched positions, an arm pivoted to the lower end of said truss, and operative connection between said arm and said bolt for retracting the bolt, and fixed means adapted to be engaged by said arm as said assembly swings from the projected to the retracted position, and to move said arm to bolt projecting position.

2. Tail wheel mechanism for aircraft having a fuselage; comprising a chassis formed at one end with a fork housing, a tail wheel fork journaled in said housing, a truss pivoted to the other end of said chassis, a shock strut pivoted at one end to the other end of said truss and at the other end to the chassis near said housing, thereby to provide a triangular assembly which is pivoted, near the pivot between said chassis and truss, for bodily swinging movement from an extended position in which the chassis is substantially horizontal to a raised, retracted position, means for establishing a latching connection between said assembly and said fuselage in the extended position in such a manner as to take the loads of ground operation, and means for establishing a latching connection between said assembly and said fuselage in the retracted position including a bolt slidably mounted in said truss and means on the fuselage for coacting with said bolt, and including an arm pivotally connected to said assembly on an axis spaced from the axis of retracting movement of the assembly, an operative connection between said arm and said bolt for drawing the bolt, and a retracting device connected to said arm and adapted first to move said arm to bolt-withdrawing position and then to transmit movement through said arm to said assembly for moving the latter to its retracted position.

3. Tail wheel mechanism for aircraft having a fuselage; comprising a chassis formed at one end with a fork housing, a tail wheel fork journaled in said housing, a truss pivoted to the other end of said chassis, a shock strut pivoted at one end to the other end of said truss and at the other end to the chassis near said housing, thereby to provide a triangular assembly which is pivoted, near the pivot between said chassis and truss, for bodily swinging movement from an extended position in which the chassis is substantially horizontal to a raised, retracted position, means for establishing a latching connection between said assembly and said fuselage in the extended position in such a manner as to take the loads of ground operation, and means for establishing a latching connection between said assembly and said fuselage in the retracted position including a bolt slidably mounted in said truss and means on the fuselage for coacting with said bolt, and including an arm pivotally connected to said assembly on an axis spaced from the axis of the retracting movement of the assembly, an operative connection between said arm and said bolt for drawing the bolt, a power retracting device connected to said arm and adapted first to move said arm to bolt-withdrawing position and then to transmit movement through said arm to said assembly for moving the latter to its retracted position, and a bungee connected to said arm for moving it to bolt-projecting position when the action of said retracting means is released, whereby to release said assembly for movement to its projected position.

4. Landing gear mechanism for aircraft comprising a retractable landing gear pivotally attached to said aircraft, means for moving said gear to and from extended position and for holding the gear in either position, said landing gear including a wheel and said aircraft including elevators and operating means therefor, means for steering said wheel and means operated by said elevators for rendering said steering means ineffective and said wheel free-castoring.

5. A device as recited in claim 4 and further including a rudder and operating means therefor selectively connectible to said steering means.

6. A landing gear mechanism for aircraft comprising a retractable landing gear pivotally attached to said aircraft, means for moving said gear to and from extended position and for holding it in either position, said landing gear including a wheel and said aircraft including a rudder and elevators and operating means therefor, means operatively connected with said rudder operating means for steering said wheel and means operated by said elevator operating mechanism for disengaging said rudder operating means from said wheel steering means.

7. A device as recited in claim 6 in which said means connecting the rudder operating means and the wheel steering means comprises a pin connection.

8. A device as recited in claim 6 in which said disconnecting means comprises a horn connected to the elevators, a cam positioned to be operated by said horn, a pin connecting said rudder operating means and said wheel steering means, and rods connecting said cam and said pin whereby operation of said elevators to a depressed position disconnects said rudder operating mechanism from said wheel steering mechanism to render said wheel freely castoring.

9. Steering mechanism for the landing gear of aircraft comprising a landing wheel, means for operating the rudder of said aircraft, means operatively connected with said rudder operating means for steering said landing wheel, and means for disconnecting said connecting means upon fully depressing the elevators of said aircraft comprising an elevator horn, a cam positioned with respect thereto and operated thereby, and lever means operatively associated with said cam and said connecting means.

DONALD M. LEITCH.

REFERENCES CITED

The following references are of record in the file of this patent:

UNITED STATES PATENTS

| Number | Name | Date |
|---|---|---|
| 1,856,778 | Monteith | May 3, 1932 |
| 2,182,333 | Cowey | Dec. 5, 1939 |
| 2,351,284 | Overbeke | June 13, 1944 |
| 2,367,649 | Noorduyn | Jan. 16, 1945 |

FOREIGN PATENTS

| Number | Country | Date |
|---|---|---|
| 525,107 | Great Britain | Aug. 21, 1940 |
| 548,916 | Great Britain | Oct. 29, 1942 |